US009591350B2

(12) United States Patent
Clift et al.

(10) Patent No.: US 9,591,350 B2
(45) Date of Patent: Mar. 7, 2017

(54) SHARING WEB APPLICATION PROGRAM GUIDE CONTENT ITEMS OVER HOME NETWORKS

(71) Applicant: Sony Corporation, Tokyo (JP)

(72) Inventors: Graham Clift, Poway, CA (US); Brant Candelore, San Diego, CA (US); Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/818,978

(22) Filed: Aug. 5, 2015

(65) Prior Publication Data

US 2016/0301969 A1  Oct. 13, 2016

Related U.S. Application Data

(60) Provisional application No. 62/146,018, filed on Apr. 10, 2015, provisional application No. 62/146,772, filed on Apr. 13, 2015.

(51) Int. Cl.
| | | |
|---|---|---|
| *H04N 7/173* | (2011.01) | |
| *H04N 21/431* | (2011.01) | |
| *H04N 21/482* | (2011.01) | |
| *H04N 21/4782* | (2011.01) | |
| *H04N 21/858* | (2011.01) | |

(Continued)

(52) U.S. Cl.
CPC ..... *H04N 21/4312* (2013.01); *H04N 21/4782* (2013.01); *H04N 21/4821* (2013.01); *H04N 21/812* (2013.01); *H04N 21/8126* (2013.01); *H04N 21/8173* (2013.01); *H04N 21/8543* (2013.01); *H04N 21/8586* (2013.01)

(58) Field of Classification Search
CPC .................................................. H04N 21/4782
USPC ......................................................... 725/133
See application file for complete search history.

(56) References Cited

U.S. PATENT DOCUMENTS

| | | | |
|---|---|---|---|
| 2002/0063727 A1 | 5/2002 | Markel | |
| 2005/0024671 A1* | 2/2005 | Abe | G06F 3/1204 358/1.13 |

(Continued)

OTHER PUBLICATIONS

Graham Clift, "Home Network Controller With Remote User Interface Wrapper of Discovered Multimedia Content", file history of related U.S. Appl. No. 13/644,097.

(Continued)

*Primary Examiner* — Michael Hong
(74) *Attorney, Agent, or Firm* — John L. Rogitz

(57) ABSTRACT

Digital living network alliance (DLNA) hypertext markup language 5 (HTML5) remote user interface (RUI) or VidiPath™ technologies are extended such that a W3C-defined <iframe> element facilitates incorporation of RUI-wrapped content into a client user interface that is a web application designed on the HTML5 RUI or VidiPath™ technology to ensure that remote user interface components of the RUI-wrapped content are rendered as an HTML5 RUI/VidiPath™ server expects, including any authentication protocol needed to verify client capability. In this way, search and playback of content, previously made available through monolithic web application (web app) based Electronic Program Guides (EPG) over a home network, are distributed without losing the programmable and graphics components provided when playing that same content via the monolithic web app EPG.

17 Claims, 4 Drawing Sheets

(51) Int. Cl.
H04N 21/8543 (2011.01)
H04N 21/81 (2011.01)

(56) References Cited

U.S. PATENT DOCUMENTS

| | | | |
|---|---|---|---|
| 2008/0065548 A1 | 3/2008 | Muijen | |
| 2008/0098101 A1 | 4/2008 | Black et al. | |
| 2009/0287794 A1 | 11/2009 | Saaranen et al. | |
| 2010/0287463 A1* | 11/2010 | Lee .................... | H04N 21/2353 715/243 |
| 2010/0305722 A1 | 12/2010 | Jin et al. | |
| 2012/0158984 A1 | 6/2012 | Maitre et al. | |
| 2014/0230074 A1* | 8/2014 | Lee ...................... | G06Q 30/018 726/27 |
| 2014/0310599 A1 | 10/2014 | Clift et al. | |
| 2015/0143419 A1* | 5/2015 | Bhagwat ............ | H04N 21/2265 725/37 |

OTHER PUBLICATIONS

Graham Clift, Jason Clement, "Computer Ecosystem with Automatically Curated Content Using Searchable Hierarchical Tags", file history of related U.S. Appl. No. 14/097,950.
"RVU Alliance Remote User Interface Now Included in DLNA Interoperability Guidelines", Press Release, Mar. 19, 2012, retrieved from http://www.reuters.com/article/2013/03/19/idUS107194+19-Mar-20.

* cited by examiner

SHARING WEB APPLICATION PROGRAM GUIDE CONTENT ITEMS OVER HOME NETWORKS

This application claims priority to U.S. provisional application No. 62/146,018, filed Apr. 10, 2015 and to U.S. provisional application No. 62/146,772, filed Apr. 13, 2015, both of which are incorporated by reference.

TECHNICAL FIELD

The application relates generally to sharing web application program guide content over networks such as home networks.

BACKGROUND

An example computer ecosystem, or digital ecosystem, which is an adaptive and distributed socio-technical system that is characterized by its sustainability, self-organization, and scalability, that is pertinent to present principles is a home network.

Technologies such as universal plug-n-play (UPnP) and digital living network alliance (DLNA) allow for audiovisual content to be served, discovered and played back over the home network via a user interface residing on client devices in the network. In addition, UPnP and DLNA define how a remote user interface (RUI) can be discovered and launched on the client device. However, neither approach allows for content that requires the RUI to be present for playback to be discovered and launched by a user interface residing on the client.

Thus, web application-based electronic program guides (EPGs) that are discovered over home networks with protocols like DLNA are monolithic, and individual content items are not accessible from third party user interfaces that may wish to search and play said content. Currently, if individual content is made available for discovery and playback, web application features that may be required by the content distributor to control the playback experience, maintain branding, verify credentials and include value added services like targeted ad insertion are not provided. Such loss of control means content distributors are reluctant to use existing technologies. Yet service operators remain concerned about loss of value to their service and the inability to innovate when a standard becomes fixed by regulation. In any case, no technology exists based on standard technologies like UPnP/DLNA that can address the above-noted drawbacks with, e.g., monolithic EPGs.

UPnP offers a service, known as a remoteUIServer service, to allow a server to advertise and a client to discover a remote user interface on a home network; DLNA uses this technology to target web based EPGs with its HTML5 RUI service and VidiPath™ services. From discovery of these services, the client will know the provider of the guide but nothing about the availability of multimedia content within. However, the content is essentially monolithic to the guide.

SUMMARY

Present principles combine the two approaches mentioned above so that audiovisual content items are still discoverable and thus searchable but they include the components of the remote user interface needed to allow a content distributor to control the playback experience or bundle value added services into that experience as if the content was played through the monolithic EPG. In particular, DLNA hypertext markup language 5 (HTML5) RUI or VidiPath™ technologies are extended such that the W3C defined <iframe> element (either a W3C <iframe> encapsulation or a separate W3C browsing context, i.e., the W3C term for a separate window or tab) provides a simple way to incorporate the RUI-wrapped content into a client user interface that is a web application designed on the HTML5 RUI/VidiPath™ technology. The use of the DLNA HTML5 RUI/VidiPath™ technology for the client side UI guarantees that the remote user interface components of the content will be rendered as the HTML5 RUI/VidiPath™ server expects, including any authentication protocol needed to verify client capability.

In this way, a user interface on a client device can choose to:

a) embed the server's RUI wrapped content in an <iframe> of its own HTML5 UI;

b) launch a separate HTML5 browsing context to play this RUI wrapped content.

In this latter ease (b), the client UI can be HTML5 but also can alternatively be a native application of any kind since HTML5 app is launched as a separate entity. A non-limiting example would be to use Android 'intents', where intents is a message protocol that Android uses for inter-application communication. A native Android app consequently can discover the RUI wrapped content and send an intent with the relevant discovered information to the VidiPath™ application to launch (or become focused.)

In an embodiment, an apparatus includes a computer memory that is not a transitory signal and that includes instructions executable by a processor to receive remote user interface (RUI)-wrapped content from an RUI server, and incorporate the RUI-wrapped content into a client UI that is a web application to ensure that remote user interface components of the RUI-wrapped content are rendered as the RUI server expects, including any authentication protocol needed to verify client capability.

In some examples, the instructions are executable to extend digital living network alliance (DLNA) hypertext markup language 5 (HTML5) RUI or VidiPath™ technologies such that a W3C-defined <iframe> element facilitates the incorporation of RUI-wrapped content into the client user interface that is a web application designed on the HTML5 RUI or VidiPath™ technology. The instructions may be executable for extending universal plug-n-play (UPnP) and DLNA protocols to enable advertisement of content to be bundled with the RUI. In examples, the instructions are executable to use an iframe to allow a client side user interface to include a server side remote user interface with authenticable integrity. The instructions may be executable to disaggregate a monolithic electronic program guide (EPG) into individual content items without losing the benefit of the monolithic EPG such that value added services including content play/seek control, ad insertion, branded graphics, user preferences, parental and accessibility controls, adaptive delivery and simulcrypt digital rights management (DRM) are facilitated.

In another embodiment, an apparatus includes a computer memory that is not a transitory signal and that includes instructions executable by a processor to access an UPnP av ContentDirectory Service having at least one protocolInfo field with an associated additionalInfo component to provide information required of a remote user interface (RUI) for rendering a video item, and using the protocolInfo field and the additionalInfo component, render the video item on a display.

In this embodiment, the protocolInfo field may specify content multipurpose Internet mail extension (MIME) type as hypertext markup language (HTML) and the additionalInfo component may specify vendor-specific HTML support requirements. The video item can be a channel with an associated res@protocol info field containing a mime type of html to indicate that the video item is to be played through a browser application. The vendor-specific HTML support requirements may define web playback requirements and in particular may indicate DLNA Commercial Video Profile-2 (CVP-2) (which is an internal name for DLNA VidiPath™) capability.

Or, the protocolInfo field can specify a content MIME type as extensible markup language (XML) and the additionalInfo component can specify an UPnP universally unique identifier (uuid) for a remote UI Server, with the video item being contained in an electronic program guide (EPG) of the remote UI Server. In this case, the additionalInfo component can specify a service description uniform resource locator (URL) and compatibleUIs UIFilter and/or inputDeviceProfile. Also, a field accompanying the protocolinfo field may be used to contain a search target set to the uuid to allow discovery of a device description associated with the uuid, with the device description containing a service list of the remote UI Server.

In another embodiment, an apparatus includes a computer memory that is not a transitory signal and that includes instructions executable by a processor to access a tag that is a subclass of a protocolInfo field of a universal plug-n-play (UPnP) specification of a Content Directory service (CDS), and render content on a display at least in part using information in the tag.

The details of the present application, both as to its structure and operation, can best be understood in reference to the accompanying drawings, in which like reference numerals refer to like parts, and in which:

DETAILED DESCRIPTION

Figure 1:
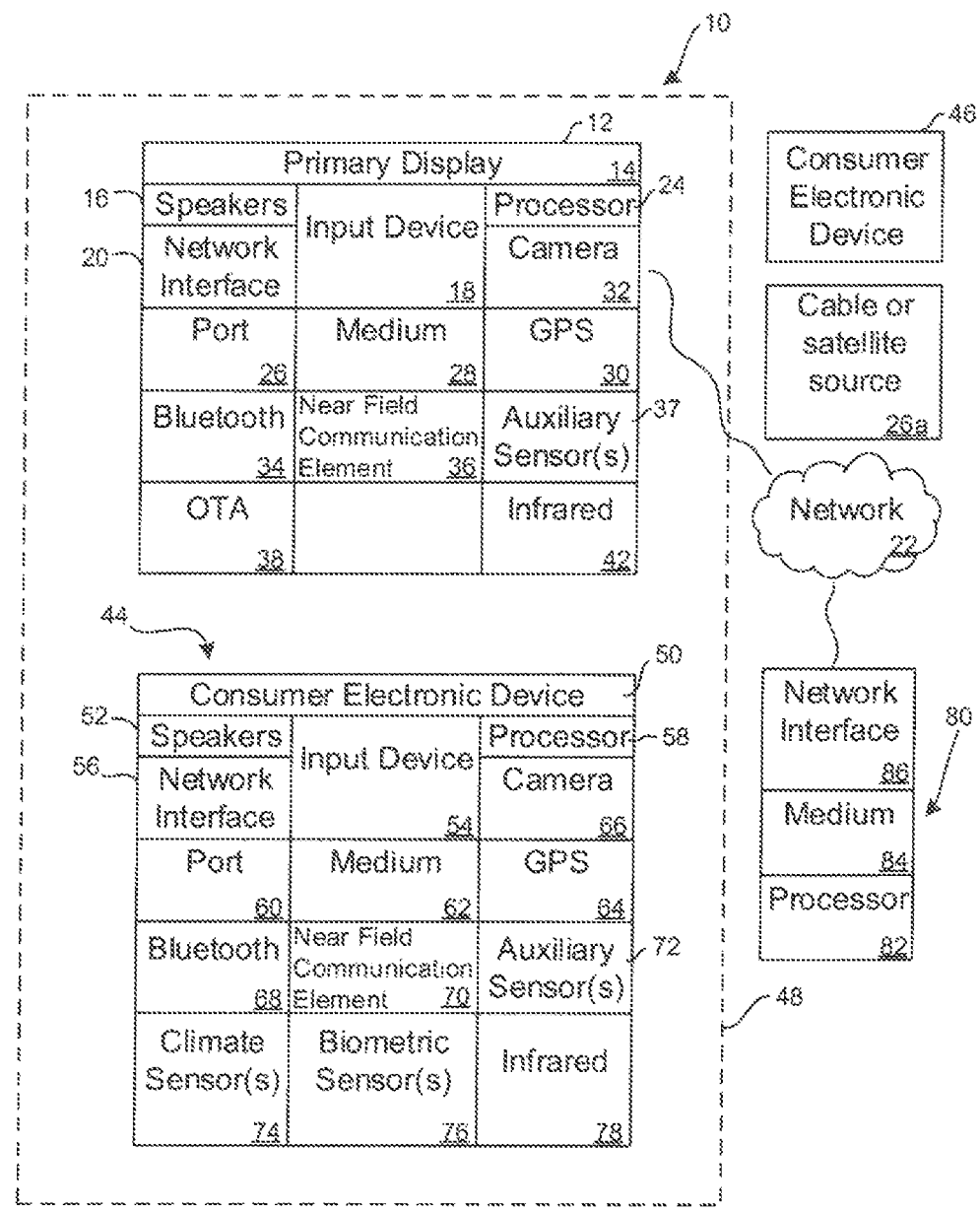
FIG. 1 is a block diagram of an example system including an example in accordance with present principles.

This disclosure relates generally to computer ecosystems including aspects of consumer electronics (CE) device networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown may be provided for powering the AVDD 12.

Still referring to FIG. 1, in addition to the AVDD 12, the system 10 may include one or more other CE device types. When the system 10 is a home network, communication between components may be according to the digital living network alliance (DLNA) protocol.

In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., is home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a game controller communicating via wired or wireless link with a game console implemented by the second CE device 46 and controlling video game presentation on the AVDD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
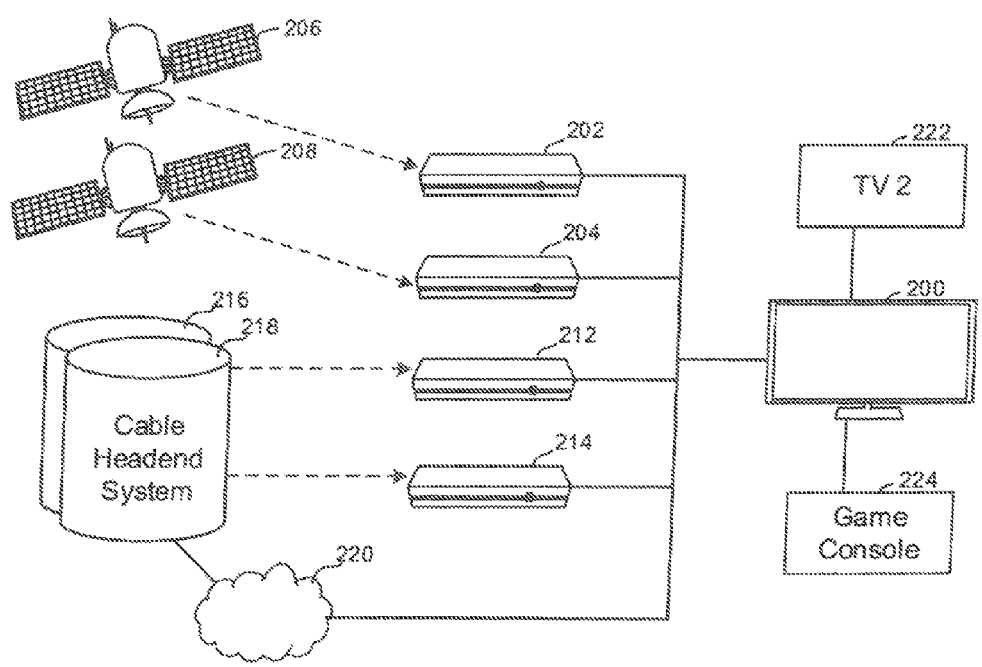
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable TV set top box-type gateways 210, 212, each of which receives content from a respective cable head end 214, 216.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote Internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using, e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

Prior to turning attention to succeeding figures, an EPG is an electronic program guide that often uses HTML5 to render the guide graphics and provide video playback and control. In addition, HTML5 provides JavaScript programmability that allows many EPG vendor specific features to be added easily to this video playback and control the whole user experience. The following is a typical list of these features:

1. W3C APIs like Media Source Extension and Encrypted Media Extension that allow the flexibility for the EPG provider to adapt to many different platforms, DRMs and network performances.

2. HTML5 graphics that allows EPG providers to overlay guide graphics, program information, branding, emergency alert systems, interactive social media elements, telephone caller ids, and so on.

3. HTML5 programmability that allows control over captions, parental ratings, user preferences, managing video seek and playback speed adjustment, ad insertion, client authentication, user authentication and so on.

Present principles understand that the features of the content discovery service (CDS) are desired by client side user interfaces for searching and browsing content without abandoning the preferred RUI rendering service that benefits EPG providers by, for instance, allowing the use of HTML5 capability on the client to render content in a way that maintains the features of the complete service offered by an EPG. In particular, present principles do not require a large modification to the UPnP service(s) and in most embodiments do not break the services as currently deployed. Present principles simply require the EPG provider to design its web app to allow content to be accessed independent of the launch. Good object-oriented programming practice, the use of Cascading Style Sheets and structured HTML as well as local storage/caching of cookies, data and JavaScript libraries, provide all the tools needed by the EPG provider to disaggregate the content from the monolithic guide without loss of service, performance or flexibility of guide design.

Figure 3:
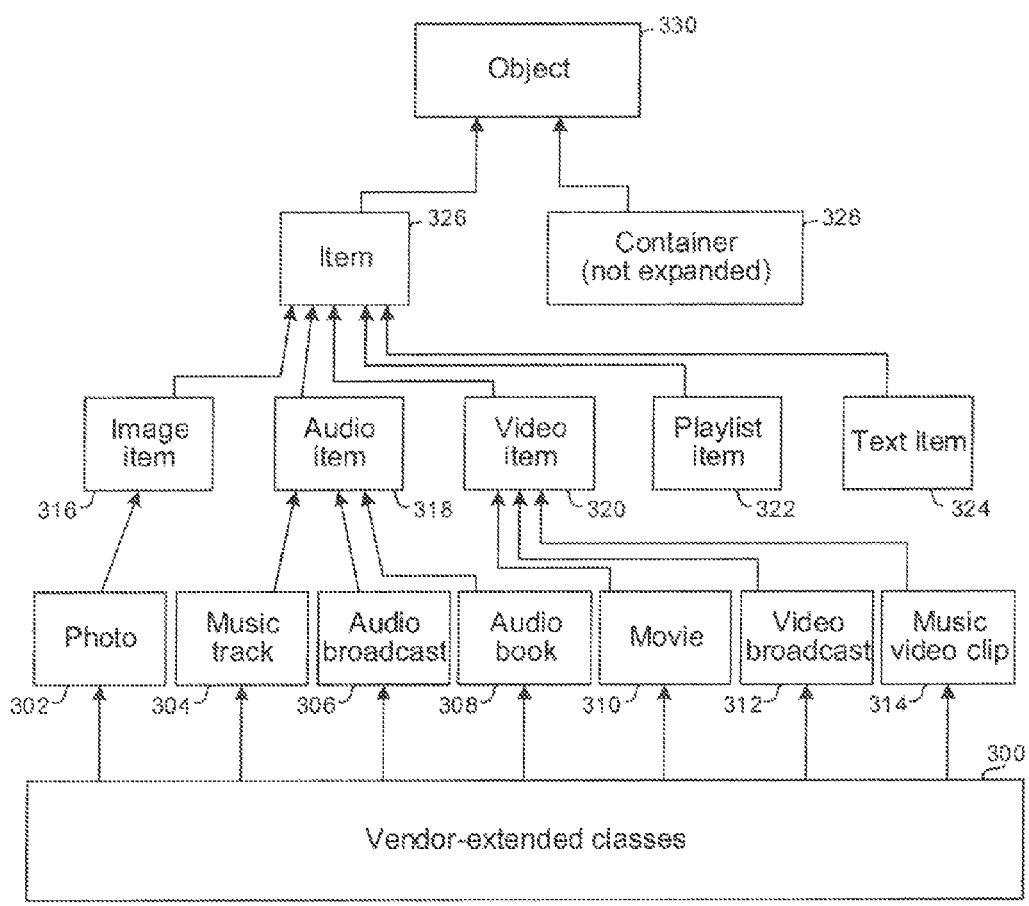
FIG. 3 is a schematic diagram of an UPnP av content Directory Service Structure.

Now referring to FIG. 3, an UPnP av ContentDirectory Service Structure is shown. Vendor-extended classes 300 produce extended classes of photographs 302, music tracks 304, audio broadcasts 306, audio books 308, movies 310, video broadcasts 312, and music video clips 314. In turn, the extended photograph class 302 can be used to establish an image item 316. In contrast, the audio-based classes 306-310 may be used to establish an audio item 318, while the video-based classes 310-314 may be used to establish a video item 320. A playlist item 322 and a text item 324 may also be provided for. FIG. 3 shows that the individual type items 316-324 may establish a single container item 326 which is used in turn along with one or more other containers 328 to establish an object 330.

Figure 4:
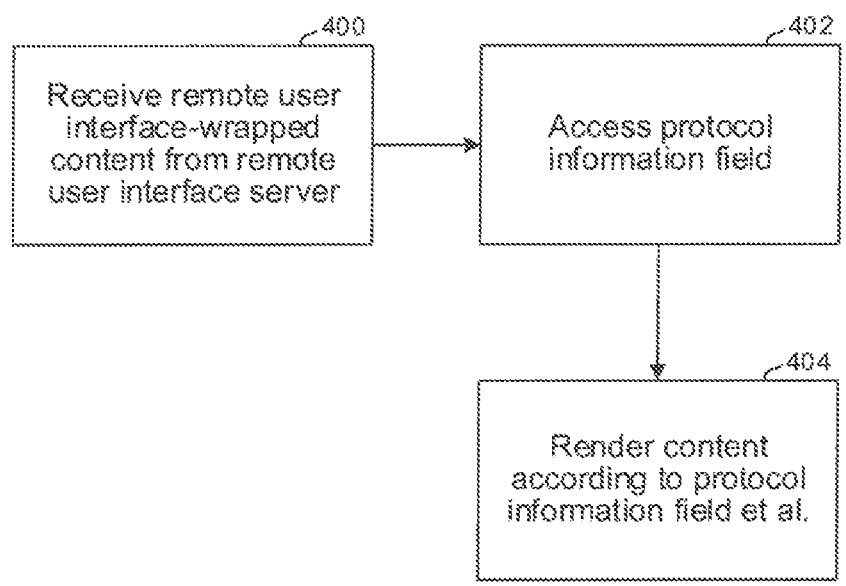
FIG. 4 is a flow chart of example logic that may be implemented by a rendering component of FIG. 1 or FIG. 2.

FIG. 4 illustrates high-level logic that may be employed by a rendering device such as any of those shown in FIGS. 1 and 2 to render content. Commencing at block 400, RUI-wrapped content is received from an RUI server that can be established by any appropriate server shown in FIGS. 1 and 2. The data from the RUT server includes multiple fields including a protocol information field that is extended according to description below, and information in this field is accessed by the rendering device at block 402. Then, at block 404 the content is rendered according to information in the protocol information field and also according to information in other fields discussed below.

With the above in mind, a first embodiment of present principles is depicted in Table 1, illustrating how a simple extension to the UPnP av ContentDirectory Service adds the requisites to launch video content that is contained in a server's EPG as an HTML page. The basic structure of the UPnP AV service remains the same allowing for the same browse and search capabilities from UPnP Control Points. The only change required is the use of protocolInfo fields on the video items to specify the content MIME type as HTML and additionalInfo to add vendor specific HTML support requirements.

In table 1 and table 2 the encoding of Content Directory Service Browse( ) or Search( ) action has been altered to support the launch of HTML based renderer to playback the content.

TABLE 1

(Example of a CDS Browse( ) or Search( ) for a Channel, requiring DLNA CVP-2 client for playback):

```
<DIDL-Lite xmlns:dc="http://purl.org/dc/elements/1.1/"
   xmlns:upnp="urn:schemas-upnp-org:metadata-1-0/upnp/"
      xmlns="urn:schemas-upnp-org:metadata-1-0/DIDL-Lite/">
         <item id="5" parentID="3" restricted="false">
            <dc:longDescription>"Harry Potter" </dc:longDescription>"
            <dc:channelNr>147</dc:channelNr>
            <upnp:class>object.item.videoItem.videoBroadcast</upnp:class>
            <res protocolInfo="http-get:*:html:<dlna:X_DLNACAP
xmlns:dlna="urn: schemas-dlna-org: device-1-0">
CVP-2<\dlna:X_DLNACAP">
                   https://10.0.0.1/getChannel?id=5
            </res>
         </item>
</DIDL-Lite>
```

In table 1, the item being a channel is defined in the videoBroadcast category and has a res@protocol info field which contains a new mime type of html to indicate this is content played through a browser application. The additional info field contains the vendor specific information that defines any special web playback requirements. In this case, the vendor field is defined as DLNA CVP-2 capability. The format of this additional field is converted to being string friendly.

Device. If the client has not already found this device then an ssdp:discover with search target set to this uuid value will allow the client control point to find this device. The device description when fetched will contain the remoteUIServer serviceList. In the above example, the additionalInfo field is populated with the URL of the required service for comparison against the serviceList in case there are more than

TABLE 2

(Example, of a CDS Browse( ) or Search( ) for a movie, requiring DLNA HTML5 RUI client for playback:

```
<DIDL-Lite xmlns:dc="http://purl.org/dc/elements/1.1/"
  xmlns:upnp="urn:schemas-upnp-org:metadata-1-0/upnp/"
      xmlns="urn:schemas-upnp-org:metadata-1-0/DIDL-Lite/">
    <item id="5" parentID="3" restricted="false">
        <dc:longDescription>"Terminator" </dc:longDescription>"
        <upnp:class>object.item.videoItem.movie</upnp:class>
        <res protocolInfo="http get:*: html:<dlna:X_DLNADOC
xmlns:dlna="urn: schemas-dlna-org: device-1-0">
+RUIHSRC+<\dlna:X_DLNADOC">
                  http://10.0.0.1/getMovie?id=Terminator
        </res>
    </item>
</DIDL-Lite>
```

In Table 2, the item is defined in the movie category and has a res@protocol. The additional info field in this case, has a vendor field defined as DLNA +RUIHSRC+ capability.

Table 3 illustrates a second embodiment, in which an extension to the UPnP av ContentDirectory Service links through a UPnP RemoteUIServer Service to add the requisites to launch video content that is contained in a server's EPG but provided a more flexible and structured approach for the client's check of remote user interface compatibility. Again, the basic structure of the UPnP AV service remains the same allowing for the same browse and search capabilities from UPnP Control Points. The only change required is the use of protocolInfo fields on the video items to specify the content MIME type as XML and additionalInfo to add the UPnP uuid for the remoteUIServer device, service description URL (if needed) and compatibleUIs UIFilter and/or inputDeviceProfile (if needed). The actual content URL in the protocolInfo element is provided as an extension to the URL provided in getCompatibleUIs action. Typically this is delivered as a query parameter by starting with '?' or as a URL extension by starting with '/' or a combination of both. Alternatively, the complete URL to the content item could be provided and the client simply checks compatibility.

one service entries in the list, or for bypassing the need to fetching the device description altogether and going straight to the service description. Also, the additionalInfo field contains an InputDeviceProfile filter to the getCompatibleUIs action that ensures only DLNA-HTML5~1.0 compatible user interfaces are returned. The client extracts the URL for the remoteUI from this action and appends with the parameter from the protocolInfo element. In this case /vod/movie?id=TerminatorHD is added. It is up the server then to provide this content as remote UI HTML5 page.

Table 4 below provides yet a third embodiment. In the above-described embodiments the protocolInfo field made use of the unspecified addionalInfo component to provide the information required of the remote user interface. While effective, these approaches require a format that is not easily readable as a result of special character replacement. This is needed to ensure colons, less-than, greater-than and quotation marks do not inadvertently break existing protocolInfo decoders. An alternate approach is shown in Table 4 that would more cleanly represent the architecture of the system, in which the UPnP specification of ContentDirectory service is extended to include a new tag as a subclass of the

TABLE 3

(Example, of a CDS Browse( ) or Search( ) for a movie, points to a remoteUIServer service for launching content playback:

```
xmlns:upnp="urn:schemas-upnp-org:metadata-1-0/upnp/"
      xmlns="urn:schemas-upnp-org:metadata-1-0/DIDL-Lite/">
    <item id="5" parentID="3" restricted="false">
        <dc:longDescription>"Terminator" </dc:longDescription>"
        <upnp:class>object.item.videoItem.movie</upnp:class>
        <res                                     protocolInfo="http
get:*:xml:uuid:2fac1234-31f8-11b4-a222-08002b34c003:SCDPURL=
10.23.1.34:1234:inputDeviceProfile="DLNA-HTML5-1.0"">
                  /vod/movie/?id=Terminator
        </res>
    </item>
</DIDL-Lite>
```

The protocolInfo additionalInfo field contains the universally unique identifier (uuid) value of the remoteUIServerprotocolInfo. This tag could point to a remoteUIServer service, for example:

TABLE 4

Example of extension to protocolInfo

```
<res protocolInfo="http-get:*:html:*">
    vod/movie/?id=Terminator
    <remoteUIservice>
        <UDN>uuid:2fac1234-31f8-11b4-a222-08002b34c003</UDN
uuid>
        <SCPDURL>10.23.1.34:1234</SCPDURL>
        <InputDeviceProfile>DLNA-HTML:5-1.0</InputDeviceProfile>
    </remoteUIservice>
</res>
```

The regime of Table 4 has the added advantage of future extensibility to include possibilities other than remote UI, including adding an applicationManagement service that uses a launch of a third party application on the client to playback the content.

In general, embodiments use HTML5 and DLNA as an example of the best practice to source a remote user interface. However, this approach is easily extensible to other protocols like HTML4, CEA2014, RVU, HbbTV and so on. The actual extensions made to the UPnP specification are also not limiting and can also be applied to other home networking technologies including Zeroconf, Dial and so on.

In addition, present principles do not limit the content playback experience to only home networks. Only the advertisement of content requires the use of a home network as shown, and this is extensible to cloud solutions sing proxy servers. A cloud based server from an EPG provider for instance may have a set of APIs to discover and browser content. This cloud based server could populate the proxy on a user's home network with the CDS, thus converting a set of custom APIs into a standardized approach readily supported by client devices.

With the above in mind, it may now be appreciated that present principles extend UPnP and DLNA protocols to enable the advertisement of content to be bundled with the remote user interface components. The iframe is used in preferred implementations to allow a client side use interface to include a server side remote user interface with authenticable integrity. A monolithic EPG is disaggregated into individual content items without losing the benefit of the monolithic EPG such that value added services such as play/seek control, ad insertion, branded graphics, user preferences, parental and accessibility controls, adaptive delivery and simulcrypt digital rights management (DRM) are provided.

Since the content is still using the service operators remote user interface component to playback, service providers are not restrained in their ability to innovate and add value. Since the remote user interface is embedded in a client side UI and the components of discovery are being made available, client side innovation is also possible. This then satisfies the needs of both service operators and client manufacturers.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. Apparatus comprising:
   at least one computer memory that is not a transitory signal and that comprises instructions executable by at least one processor to:
   receive remote user interface (RUI)-wrapped content from an RUI server; and
   incorporate the RUI-wrapped content into a client UI that is a web application to ensure that remote user interface components of the RUI-wrapped content are rendered as the RUI server expects, including receiving and processing an extension of universal plug-n-play (UPnP) specification of ContentDirectory service, the extension comprising a tag as a subclass of a protocolInfo field, the tag pointing to a service as follows:
   <[service type]>
       <UDN>uuid:([string 1]</UDN uuid>
       <SCPDURL>[string 2]</SCPDURL>
       <InputDeviceProfile>[string 3]</InputDeviceProfile>
   </[service type]>
   </res>, wherein string 1, string 2, and string 3 are character sequences.

2. The apparatus of claim 1, wherein the instructions are executable to extend digital living network alliance (DLNA) hypertext markup language 5 (HTML5) RUI or VidiPath™ technologies such that a W3C-defined <iframe> element facilitates the incorporation of RUI-wrapped content into the client user interface that is a web application designed on the HTML5 RUI or VidiPath™ technology, the W3C-defined <iframe> element being either a W3C <iframe> encapsulation or a separate W3C browsing context.

3. The apparatus of claim 1, comprising the at least one processor.

4. The apparatus of claim 1, wherein the instructions are executable for:
   extending universal plug-n-play (UPnP) and DLNA protocols to enable advertisement of content to be bundled with the RUT.

5. The apparatus of claim 1, wherein the instructions are executable to:
   use an iframe to allow a client side user interface to include a server side remote user interface with authenticable integrity.

6. The apparatus of claim 1, wherein the instructions are executable to:
   disaggregate a monolithic electronic program guide (EPG) into individual content items without losing the benefit of the monolithic EPG such that value added services including content play/seek control, ad insertion, branded graphics, user preferences, parental and accessibility controls, adaptive delivery and simulcrypt digital rights management (DRM) are facilitated.

7. The apparatus of claim 3, comprising the at least one processor controlling a display to present the content on the display.

8. Apparatus comprising:
   at least one computer memory that is not a transitory signal and that comprises instructions executable by at least one processor to:
   access a universal plug-n-play (UPnP) av ContentDirectory Service having at least one protocolInfo field with an associated additionalInfo component to provide information required of a remote user interface (RUI) for rendering a video item; and using the protocolInfo field and the additionalInfo component, render the video item on a display, wherein the protocolInfo field specifies content multipurpose Internet mail extension (MIME) type as hypertext markup language (HTML) and the additionalInfo component specifies vendor-specific HTML support requirements, wherein the video item is a channel with an associated res@protocol info field containing a MIME type of HTML to indicate that the video item is to be played through a browser application.

9. The apparatus of claim 8, comprising the at least one processor.

10. The apparatus of claim 8, wherein the vendor-specific HTML support requirements define web playback requirements.

11. The apparatus of claim 8, wherein the protocolInfo field includes:

<protocolInfo="http-get:*:html:[string 1];X_DLNACAP [string 2]; device-1-[string 3]>, wherein string 1 and string 2 are character sequences and a channel content or movie content is defined in the protocolInfo field, which indicates a mime type of HTML to indicate the content is to be played through a browser application.

12. The apparatus of claim 9, comprising the at least one processor controlling a display to present the content on the display.

13. The apparatus of claim 10, wherein the vendor-specific HTML support requirements indicate digital living network alliance (DLNA) CVP-2 capability.

14. Apparatus comprising:
at least one computer memory that is not a transitory signal and that comprises instructions executable by at least one processor to:
access a universal plug-n-play (UPnP) av ContentDirectory Service having at least one protocolInfo field with an associated additionalInfo component to provide information required of a remote user interface (RUI) for rendering a video item; and
using the protocolInfo field and the additionalInfo component, render the video item on a display, wherein the protocolInfo field specifies a content MIME type as extensible markup language (XML) and the additionalInfo component specifies an UPnP universally unique identifier (uuid) for a remote UI Server, the video item being contained in an electronic program guide (EPG) of the remote UI Server.

15. The apparatus of claim 14, wherein the additionalInfo component specifies a service description uniform resource locator (URL) and compatibleUIs UIFilter and/or inputDeviceProfile.

16. The apparatus of claim 14, wherein a field contains a search target set to the uuid to allow discovery of a device description associated with the uuid, the device description containing a service list of the remote UI Server.

17. The apparatus of claim 14, wherein the protocolInfo field includes:

<protocolInfo="http get:*:xml:uuid [string 1]; SCD-PURL=[string 2];inputDeviceProfile=[string 3]">, wherein string 1, string 2, and string 3 are character sequences, "uuid" is a universally unique identifier (uuid) value of a remote UI server.

* * * * *